United States Patent
Geyer (10) Patent No.: US 12,155,412 B1
(45) Date of Patent: Nov. 26, 2024

(54) POLARIZATION DEPENDENT LOSS MITIGATION

(71) Applicant: Acacia Communications, Inc., Maynard, MA (US)

(72) Inventor: Jonas Geyer, Somerville, MA (US)

(*) Notice: Subject to any disclaimer, the term of this patent is extended or adjusted under 35 U.S.C. 154(b) by 0 days.

(21) Appl. No.: 17/071,634

(22) Filed: Oct. 15, 2020

(51) Int. Cl.
*H04B 17/00* (2015.01)
*H04B 10/077* (2013.01)
*H04B 10/2569* (2013.01)
*H04B 10/532* (2013.01)

(52) U.S. Cl.
CPC ..... *H04B 10/0775* (2013.01); *H04B 10/2569* (2013.01); *H04B 10/532* (2013.01)

(58) Field of Classification Search
CPC ............ H04B 10/0775; H04B 10/2569; H04B 10/532
USPC ..................................................... 398/25, 152
See application file for complete search history.

(56) References Cited

U.S. PATENT DOCUMENTS

| | | | | |
|---|---|---|---|---|
| 7,970,285 B2 * | 6/2011 | Conroy | .................. | H04B 10/58 398/154 |
| 8,903,238 B2 * | 12/2014 | Pfau | .................... | H04L 27/2096 398/152 |
| 9,036,751 B1 * | 5/2015 | Wang | ................ | H04L 25/03878 375/350 |
| 2002/0176645 A1 * | 11/2002 | Wein | ................... | H04B 10/2569 385/11 |
| 2009/0066937 A1 * | 3/2009 | Hui Bon Hoa | ...... | G01M 11/333 356/73.1 |
| 2013/0051801 A1 * | 2/2013 | Kuschnerov | ........... | H04B 10/50 398/65 |
| 2015/0093119 A1 * | 4/2015 | Gorshtein | .......... | H04B 10/2569 398/159 |
| 2016/0204871 A1 * | 7/2016 | Li | ....................... | H04L 27/2601 398/183 |

FOREIGN PATENT DOCUMENTS

CN          101931469 A   * 12/2010   ........... H04B 10/148
WO     WO-2014141536 A1  *  9/2014   ......... H04B 10/2543

* cited by examiner

*Primary Examiner* — Mohammad R Sedighian
(74) *Attorney, Agent, or Firm* — K&L GATES LLP (57) ABSTRACT

A system, comprising an optical transmitter including a memory and one or more processors, wherein the one or more processors are in communication with the memory and configured to perform creating a first signal and a second signal, wherein the first signal and the second signal are each polarized; rotating a polarization of the first signal and the second signal by θ degrees; adding a differential group delay (DGD) to the second optical signal; generating a first optical signal from the first signal; and generating a second optical signal from the second signal.

25 Claims, 9 Drawing Sheets

POLARIZATION DEPENDENT LOSS MITIGATION

FIELD

This disclosure relates generally to the field of signal loss mitigation in optical communication systems.

BACKGROUND

Contemporary optical communications and other photonic systems make extensive use of photonic integrated circuits that are advantageously mass-produced in various configurations for various purposes.

SUMMARY

In part, in one aspect, the disclosure relates to a method of mitigating polarization dependent loss, the method comprising generating a first signal having a first polarization and a second signal having a second polarization, wherein the first polarization and the second polarization are different; rotating a polarization of the first signal and the second signal by θ degrees; adding a differential group delay (DGD) to the second signal; generating a first optical signal from the first signal; and generating a second optical signal from the second signal, wherein a combined optical signal includes the first optical signal and the second optical signal.

In one embodiment, the method further comprises where θ is about 45 degrees. In one embodiment, the method further comprises where the DGD is between about 1 symbol and 40 symbols. In one embodiment, the method further comprises sending the first optical signal and the second optical signal across a fiber link; and wherein the DGD is greater than a delay of the fiber link. In one embodiment, the method further comprises receiving the first optical signal and the second optical signal; adding the DGD to the first optical signal; and reversing the polarization of the first optical signal and the second optical signal by θ degrees. In one embodiment, the method further comprises where the first optical signal is vertically polarized and the second optical signal is horizontally polarized. In one embodiment, the method further comprises where the first polarization and the second polarization are orthogonal. In one embodiment, the method further comprises where the DGD is greater than about 1 symbol.

In part, in one aspect, the disclosure relates to a non-transitory machine readable medium storing code, which when executed by a processor is configured to create a first signal and a second signal, wherein the first signal and the second signal are each polarized; rotate a polarization of the first signal and the second signal by θ degrees; add a differential group delay (DGD) to the second signal; generate a first optical signal from the first signal; and generate a second optical signal from the second signal.

In one embodiment, the non-transitory machine readable medium storing code, which when executed by a processor is further configured where θ is about 45 degrees. In one embodiment, the non-transitory machine readable medium storing code, which when executed by a processor is further configured where the DGD is between about 1 symbol and about 40 symbols. In one embodiment, the non-transitory machine readable medium storing code, which when executed by a processor is further configured to send the first optical signal and the second optical signal across a fiber link; and wherein the DGD is greater than a delay of the fiber link. In one embodiment, the non-transitory machine readable medium storing code, which when executed by a processor is further configured to receive the first optical signal and the second optical signal; add the DGD to the first optical signal; and reverse the polarization of the first optical signal and the second optical signal by θ degrees. In one embodiment, the non-transitory machine readable medium storing code, which when executed by a processor is further configured where the first optical signal is vertically polarized and the second optical signal is horizontally polarized. In one embodiment, the non-transitory machine readable medium storing code, which when executed by a processor is further configured where the first polarization and the second polarization are orthogonal.

In part, in one aspect, the disclosure relates to a system, comprising an optical transmitter including a memory and one or more processors, wherein the one or more processors are in communication with the memory and configured to perform creating a first signal and a second signal, wherein the first signal and the second signal are each polarized; rotating a polarization of the first signal and the second signal by θ degrees; adding a differential group delay (DGD) to the second optical signal; generating a first optical signal from the first signal; and generating a second optical signal from the second signal.

In one embodiment, the system further comprises where θ is about 45 degrees. In one embodiment, the system further comprises where the DGD is between about 1 symbol and 40 symbols. In one embodiment, the system where the one or more processors are further configured to perform sending the first optical signal and the second optical signal across a fiber link; and wherein the DGD is greater than a delay of the fiber link. In one embodiment, the system further comprises where the one or more processors are configured to perform receiving the first optical signal and the second optical signal; adding the DGD to the first optical signal; and reversing the polarization of the first optical signal and the second optical signal by θ degrees. In one embodiment, the system further comprises where the first optical signal is vertically polarized and the second optical signal is horizontally polarized.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

In some embodiments, the disclosure may relate to mitigating losses associated with transmitting optical signals that encode data using one or more optical channels and/or through one or more multiplexing schemes. In various embodiments, polarization multiplexing may be used along with other modulation or multiplexing schemes to encode data or facilitate transmitting two optical signals simultaneously. In certain embodiments, one or more optical signals may be transmitted wherein a given optical signal has a particular polarization state that differs from the other optical signals transmitted as a combined optical signal. In some embodiments, polarization states may be orthogonal and may be used to effectively define two or more optical channels that are separate from each other, but may be transmitted as a combined signal.

As an example, a given optical signal may have a first polarization and a second polarization such as a horizontal (H) or vertical (V) polarization or otherwise specified by an angle corresponding to rotation of a polarization state for a given optical signal. In various embodiments, polarized optical signals may be transformed or operated upon, such as through modifications to polarization of a combined optical signal prevent optical signal losses from PDL resulting from an optical fiber segment or any components or relays in an optical network. In some embodiments, a combined optical signal may be modified to reduce impact of unforeseen polarization changes or other PDL as the signal is transmitted from its source to its destination through various optical paths and intervening lossy and noise contributing network components. In certain embodiments, an improved signal to noise ratio for each optical signal having an initial polarization may be achieved by altering the combined signals polarization state, such as by a polarization rotation process. In certain embodiments, altering the polarization state of the combined signal effectively may allow a combined signal to more resilient to PDL such that when an inverse operation is used to undo the initial polarization change, the constituent individual signals are obtained without any substantial loss of signal.

Traditionally, PDL is a random effect caused by asymmetries within an optical fiber or otherwise contributed to by lossy components such as repeaters, amplifiers, and other components that span a given transmission path from source to destination. Typically, PDL can be introduced in any portion of an optical transmission system, such as in a transmitter, receiver, or transmission link. Generally, an optical fiber could be a one long segment of optical fiber or multiple segments of optical fiber connected and/or joined together to create a continuous optical fiber or a network having various paths, loops, and topologies.

Typically, each segment of optical fiber, that defines a path through an optical network, changes the angle and/or state of the polarization of an optical signal passing through the network. Conventionally, measuring the change in angle and/or state of polarization caused by asymmetries of an optical fiber can be difficult, as the angle and/or state imparted on a signal passing through the optical fiber is unpredictable and continually changing. For example, typically, an optical fiber can impart a change in angle and/or state of polarization of a signal at a rate of ~1 rad/sec in a slowly changing case or ~1 Mrad/sec in a very fast changing case, which can happen when the fiber is affected for example by mechanical vibrations or by lightning strikes hitting aerial Optical Ground Wire (OGW) cables.

Generally, as part of various data multiplexing schemes, the data that needs to be transmitted can be encoded by modulating a light source in terms of various parameters, such as frequency, phase, and amplitude. In addition, generally, different polarization states may be used to transmit data using different optical signals wherein the differing polarizations effectively allow each signal to be segregated from the other signal. Traditionally, multiple optical signals having unique polarization states may be transmitted as a combined signal or otherwise transmitted simultaneously with each other. Typically, PDL can causes attenuation and/or gain on each transmitted signal having its own individual polarization. However, generally, one polarization state, and thus the underlying signal transmitted with such a state, may be more significantly amplified or attenuated than the other signal.

In certain embodiments, various systems and methods for mitigating the effects of PDL through the use of changing polarization state of an optical signal such as a combined optical signal may be described herein. In various embodiments, each polarized component signal of a combined optical signal may be changed to minimize or reduce the effects of PDL. In many embodiments, equalizing or distributing the effects of noise and losses on each respective component of the optical signal may facilitate transmitting a combined signal that mitigates losses such as PDL with regard to the component signals. In certain embodiments, when PDL associated with a given optical fiber or optical network is aligned with a first or second polarization state of the transmitter, optical signals sent from a transmitter may experience losses and errors when receiving the optical signals and converted them back to the underlying data. In some embodiments, systems and methods disclosed herein may address polarization rotation, attenuation, and/or gain, acquired during transmission of an optical signal through an optical fiber, due to PDL and other sources.

In various embodiments, each polarized component of an optical signal may be modified such that the optical signal is agnostic to any polarization, attenuation, and/or gain imparted on optical signals transmitted through an optical fiber, which provides optimal performance when being transmitted across an optical fiber. In various embodiments, an optical signal may include multiple polarizations of light, which may be referenced as components of an optical signal. In some embodiments, a combined optical signal may include two or more component optical signals having differing initial polarization states.

In various embodiments, an optical system may include PDL mitigation capabilities within an application specific integrated circuit (ASIC) within a transmitter and an associated receiver. In certain embodiments, a transmitter may be in optical communication with the receiver via an optical fiber or optical network. In many embodiments, an optical transmitter may receive data to be transmitted over an optical fiber to an optical receiver. In various embodiments, an optical transmitter may create an optical signal from the received data. In various embodiments, the optical transmitter may encode the optical signal to minimize the effects of PDL during transmission across optical fiber.

The optical signals are typically generated using coherence light with laser sources in various embodiments. In turn, in various embodiments, two or more signals may be transmitted together having different polarization states such that each polarization may correspond to a separate communication channel. In many embodiments, an initial polarization state may be used for different optical signals to increase the amount of data that may be transmitted optically. In certain embodiments, each polarization state, such as a first initial polarization (horizontal (H), for example) and a second initial polarization state (vertical (V), for example) may be used so that two (or more) optical signals may be transmitted with encoded data simultaneously. In many embodiments herein references to vertical polarization or horizontal polarization herewith may also be referred to first and second polarizations (and vice versa) that have differing polarizations. In turn, in various embodiments, each of the differently polarized optical signals may be further multiplexed to encode more data. In some embodiments, a given optical signal may encode data through one or more technologies, such as for example phase multiplexing, amplitude multiplexing, frequency multiplexing, polarization multiplexing, Binary Phase Shift Keying (BPSK), dual polarization BPSK (DP-BPSK) Quadrature amplitude modulation (QAM), Quadrature Phase Shift Keying (QPSK), and others.

In yet other embodiments, encoding, modifying or altering an optical signal may include rotating the polarization states of the optical signal and adding a differential group delay (DGD) to one component of the optical signal with respect to the other component. In various embodiments, an optical transmitter may rotate an optical signal polarization by about 45 degrees, which may cause a minimum or reduced signal to noise ratio when transmitting across a fiber cable. In certain embodiments, the optical transmitter may add a DGD of about 1 to 1000 symbols. In various embodiments, a symbol may be equivalent to 4 bits. In some embodiments, an optical transmitter may function while adding a DGD as small as about 1 symbol. In other embodiments, any DGD greater or equal than 1 symbol may be used. In various embodiments, DGD added to a component of an optical signal may be larger than a delay that could be expected in an optical signal across a fiber cable. In some embodiments delay may de-correlate noise from different sources on the optical link, which allows minimize the impact of noise.

For example, in one embodiment, an optical signal may be represented by $S_{H,A}(t)$ and $S_{V,A}(t)$, where $S_{H,A}(t)$ is in the horizontal polarization and $S_{V,A}(t)$ is in a vertical polarization. In this embodiment, a transmitter may rotate the polarization of each optical signal by about 45 degrees. As shown by the equations below, each optical signal is rotated by adding, or subtracting, $S_{V,A}(t)$ from $S_{H,A}(t)$.

$$S_{H,B}(t) = \frac{1}{\sqrt{2}}(S_{H,A}(t) - S_{V,A}(t)) \text{ and}$$

$$S_{V,B}(t) = \frac{1}{\sqrt{2}}(S_{H,A}(t) + S_{V,A}(t))$$

In this embodiment, rotation of each component by 45 degrees causes each component of the optical signal to be equally affected by attenuation and gain due to PDL. In this embodiment, the transmitter may delay the component previously polarized horizontally (as shown by the equations below) by an amount δ, which is equal or larger than the symbol duration, to de-correlate noise sources of the optical link.

$$S_{H,C}(t) = S_{H,B}(t-\delta) \text{ and } S_{V,C}(t) = S_{V,B}(t)$$

In this configuration, in this embodiment, both of the original components of the optical signal may be equally and minimally effected by attenuation and gain from PDL when transmitted across an optical fiber, which enables transmission of optical signals with an optimal signal to noise ratio. In various embodiments, other amount of rotation may be used, however, when transmitting two components within an optical signal, about 45 degrees may be optimal.

In various embodiments, upon receipt of an optical signal at an associated receiver, an optical receiver may convert an optical signal to a digital signal and passes each component of a signal through an adaptive equalizer. In many embodiments, an adaptive equalizer may include a dynamic filter that may be periodically updated, such as continually updated, to equalize the received signal to mitigate any effects due to PDL acquired during transmission across an optical fiber. In various embodiments, once the effects of transmission are mitigated, a receiver may add a delay to the non-delayed component of an optical signal and reverses a rotation of the optical signal to obtain the originally transmitted signal. In most embodiments, once an optical signal is decoded, a receiver may retrieve data included within a transmission. In general, operations or transformations of encoding or altering a combined optical signal with two or more differently polarized component optical signals that include rotating the polarization of a combined signal and adding a group delay may be subsequently undone by inverse or reverse operations to obtain the component signals.

For example, in one embodiment, signals received by an optical receiver which have been corrected for PDL and polarization changes from an optical network may be represented by $S_{H,J}(t)$ and $S_{V,J}(t)$. In this embodiment, the optical receiver adds a delay to the non-delayed component, as shown in the following equation below.

$$S_{H,K}(t) = S_{H,J}(t) \text{ and } S_{V,K}(t) = S_{V,J}(t-\delta)$$

In this embodiment, the optical receiver then reverses the polarization by about 45 degrees, as shown below in the following equations.

$$S_{H,L}(t) = \frac{1}{\sqrt{2}}(S_{H,K}(t) + S_{V,K}(t)) \text{ and}$$

$$S_{V,L}(t) = \frac{1}{\sqrt{2}}(-S_{H,K}(t) + S_{V,K}(t))$$

At this point, in this embodiment, the signals $S_{H,L}(t)$ and $S_{V,L}(t)$ can be further post processed by the optical receiver.

Figure 1:
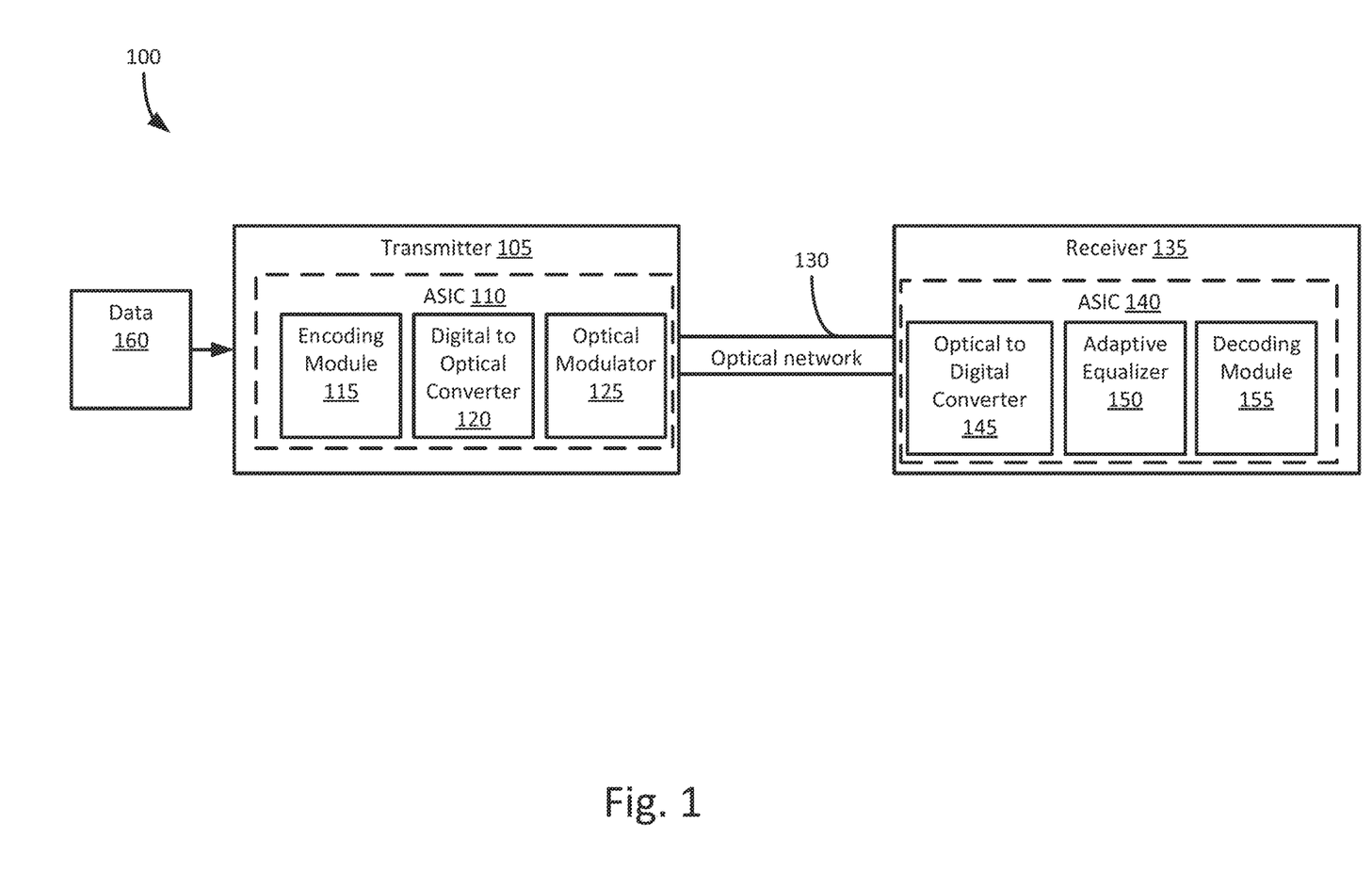
FIG. 1 illustrates a high level component diagram of a system implementing polarization dependent loss (PDL) mitigation, in accordance with one or more aspects of the disclosure.

Refer now to the example embodiment of FIG. 1, which shows a high level component diagram of a system implementing mitigation for PDL, in accordance with one or more aspects of the disclosure. As shown in FIG. 1, the system 100 includes a transmitter 105 and a receiver 135 that are in optical communication using an optical network 130. The optical network 130 may include one or more optical paths implemented using one or more optical fiber segments and various other optical components. The optical fiber segments and other components of the optical network may individually and in the aggregate introduce optical signal losses such as polarization dependent losses as a given optical signal makes its ways from its source to its destination along the network 130. The transmitter 105 includes an application specific integrated circuit (ASIC) 110 operable to implement polarization rotation, addition of a delay, or other optical signal transformations disclosed herein. The ASIC 110 may include an encoding module 115, a digital to optical converter 120, and an optical modulator 125.

As shown in FIG. 1, the encoding module 115 includes the data 160 within a first signal and a second signal. Each of the first and second signals have differing polarizations, which effectively allow them to serve as separate communication channels through which data may be multiplexed through one or more methods. The encoding module 115 then encodes the first signal and the second signal by rotating polarization angle of each signal by 45 degrees. The encoding module 115 may also subsequently add a delay to the horizontally polarized component. The digital to optical converter 120 and the optical modulator 125 converts the signal to an optical signal to be transmitted across the optical network 130. Once the signal is received at receiver 135, the optical to digital converter 145 (FIG. 1) converts the optical signal into a digital signal. Subsequently, the adaptive equalizer 150 filters the digital signal by removing any rotation, attenuation, and/or gain acquired during the transmission across the optical fiber 130. The decoding module 155 reverses the encoding by adding delay to the vertically polarized component of the optical signal and reversing the rotation of each component of the optical signal.

Figure 2:
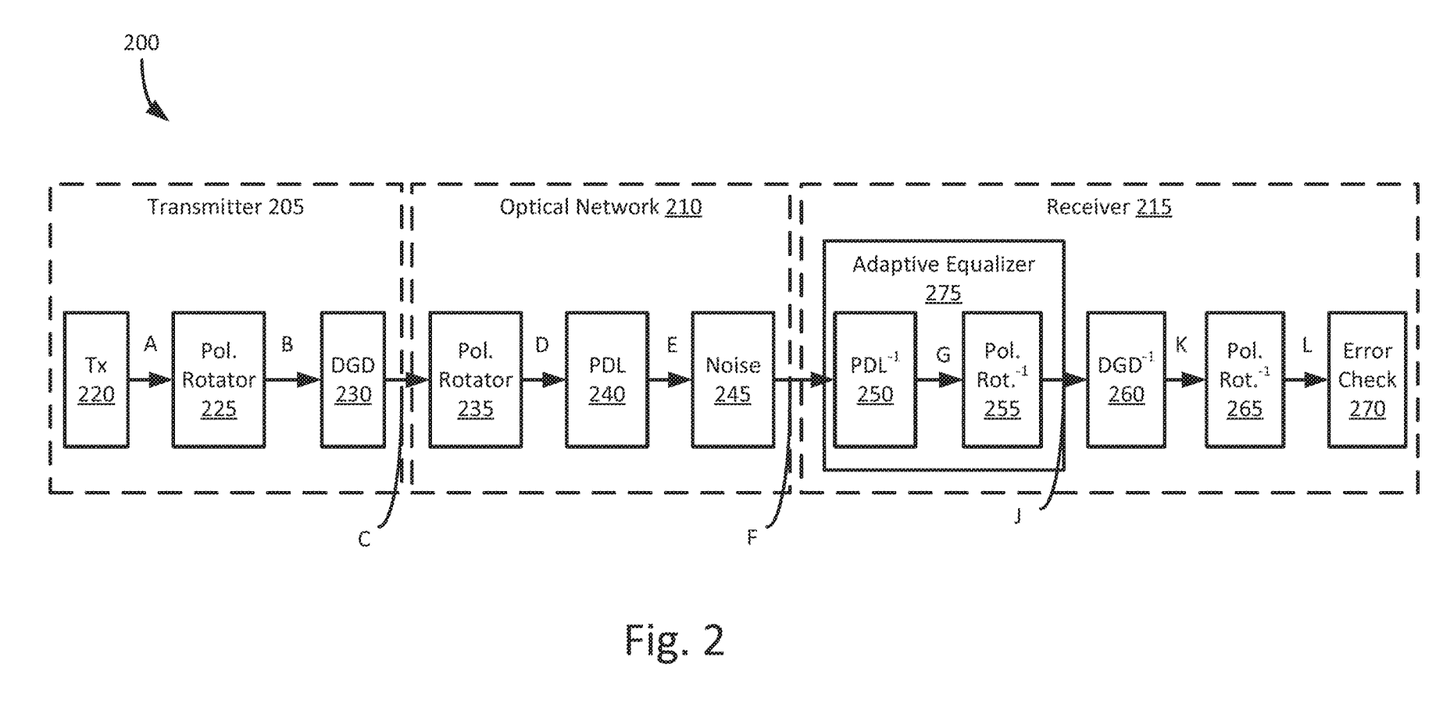
FIG. 2 illustrates is a block diagram illustrating a functional model of a system implementing mitigation for PDL using various polarization changing components in accordance with one or more aspects of the disclosure.

FIG. 2 shows a functional model of a system implementing PDL mitigation, in accordance with one or more aspects of the disclosure. System 200 shows the transmitter 205, optical network 210, and receiver 215. The transmitter 205 includes Tx 220, a polarization rotator 225, and a DGD 230. The optical network 210 can be composed of various elements such as optical fiber segments and others as described herein, including with regard to optical network 130. The receiver 215 includes an adaptive equalizer 275, inverse DGD (DGD$^{-1}$) 260, inverse polarization rotator (polarization rotator$^{-1}$), and an error checker 270. In some instances, the error checker 270 may provide feedback to the adaptive equalizer 275 to improve filtering of any incoming signals. The optical network is shown as a representative model of the types of components that may exist in a network that can cause signal losses such as PDL and reduce the signal to noise ratio of the component signals. A given network 210 may include an interface that acts as a polarization rotator 235. The network can include various components that contribute PDL 240. In addition, various network components will add noise 245 to the signals as they are transmitted. In this embodiment, the Tx 220, polarization rotator 225, and DGD 230 represent functional capabilities of the encoding module 115 (FIG. 1) on the ASIC 110 (FIG. 1). Similarly, the adaptive equalizer 275, DGD$^{-1}$ 260, polarization rotator$^{-1}$, and an error checker 270 represent the functional capabilities of the ASIC 140 (FIG. 1).

Various interface, operations and intermediate signals are identified as A through L in FIG. 2, which also correspond to various outputs, variables, vectors, and equations and recited below. Signals identified as A and C represent intermediate and final outputs from each component with the transmitter 205. B is a matrix operating on signals A to rotate the polarization state of the component signals. The operations and signals identified as D through F, in combination, represent the polarization, PDL, and noise effects of the optical network 210 on any optical signal transmitted through the optical network 210. The signals and operators identified as G through L represent intermediate steps from each component within the receiver 215, where the steps identified as G and J represent the output from filtering by the adaptive equalizer 275.

As shown in FIG. 2, the transmitter receives data and/or a message to transmit across the optical network 210 and the Tx 220 creates a dual polarity optical signal having a vertically polarized component and a horizontally polarized component. The output of the Tx 220 shown by identifier A is represented by the following vector.

$$A = \begin{pmatrix} A_H \\ A_V \end{pmatrix},$$

with AH and AV being horizontal and vertical polarization components

Subsequently, the signal, shown at identifier B, is created when the polarization rotator 225 rotates each of the components of the optical signal by about 45 degrees, shown by the following equation.

$$B = R_1 * A, \text{ where } R_1 = \frac{1}{\sqrt{2}} \begin{pmatrix} 1 & -1 \\ 1 & 1 \end{pmatrix}$$

The DGD 230 then adds a delay to the horizontal polarization of the optical signal, shown at identifier C, which can be sent across the optical network 210, which is represented by the following vector.

$$C = \begin{pmatrix} B_{H,d} \\ B_V \end{pmatrix},$$

where BH,d represents the time delayed component BH with delay δ.

During transmission, the optical signal is modified by polarization rotation 235, PDL 240, and noise 245 as the signal passes through the various modules and interfaces identified by D, E, and F. Each of the identifiers D, E, and F may be represented as a column vector or matrix representation and may be specified by the following equations and representations.

$$D = R_2(\theta) * C, \text{ where } R_2(\theta) = \begin{pmatrix} \cos\theta & -\sin\theta \\ \sin\theta & \cos\theta \end{pmatrix}$$

$$E = \begin{pmatrix} \sqrt{1-\gamma}\, D_H \\ \sqrt{1+\gamma}\, D_V \end{pmatrix},$$

where γ causes the effect of PDL $$F = E + N = \begin{pmatrix} E_H + N_H \\ E_V + N_V \end{pmatrix},$$

with $N_H$ and $N_V$ having the same power

As shown in the above equations and representations, optical noise N is added at point F, where the noise power in the horizontal polarization (NH) is identical with the noise power in the vertical polarization (NV). Once the optical signal is received at receiver 215, the adaptive equalizer 275 processes filters the signal and removes PDL 240 and any polarization rotation 235 imparted by the optical network 210 using PDL$^{-1}$ 250 and polarization rotation$^{-1}$ 255, reflected by the following equations. Each of the outputs from the adaptive equalizer 275 may be represented by the following equations and representations.

$$G = \begin{pmatrix} F_H / \sqrt{1-\gamma} \\ F_V / \sqrt{1+\gamma} \end{pmatrix}$$

$$J = R_3(\theta) * G, \text{ with } R_3(\theta) = \begin{pmatrix} \cos\theta & \sin\theta \\ -\sin\theta & \cos\theta \end{pmatrix}$$

After filtering the optical signal in the adaptive equalizer 275, the receiver adds a delay at DGD$^{-1}$ 260 and reverses the polarization by 45 degrees at the inverse polarization operator, which is also depicted as polarization rotation$^{-1}$ 265, reflected by the following equations.

$$K = \begin{pmatrix} J_H \\ J_{V,d} \end{pmatrix},$$

with subscript "d" meaning delayed by γ

$$L = R_4 * K, \text{ with } R_4 = \begin{pmatrix} 1 & 1 \\ -1 & 1 \end{pmatrix}$$

Subsequently, the receiver is operable to further process the received optical signals.

In many embodiments, an initial rotation of polarization of each component of an optical signal and an additional delay on one component of an optical signal may optimize a signal to noise ratio on both components of the optical signal. In various embodiments, an initial rotation of polarization may cause attenuation and/or gain due to PDL to be balanced across both polarizations, which may be beneficial to maximize or otherwise increase signal to noise ratio of one or more components of an optical signal. For example, as shown in FIG. 2, the optical network 210 modifies a transmitted optical signal with rotation of polarization 245, attenuation and/or gain due to PDL 240, and/or noise 245. In the example of FIG. 2, upon receiving an optical signal, an adaptive equalizer 275 removes attenuation and/or gain due PDL 240 and rotation 145 to obtain the original optical signal with noise 155.

Figure 3A:
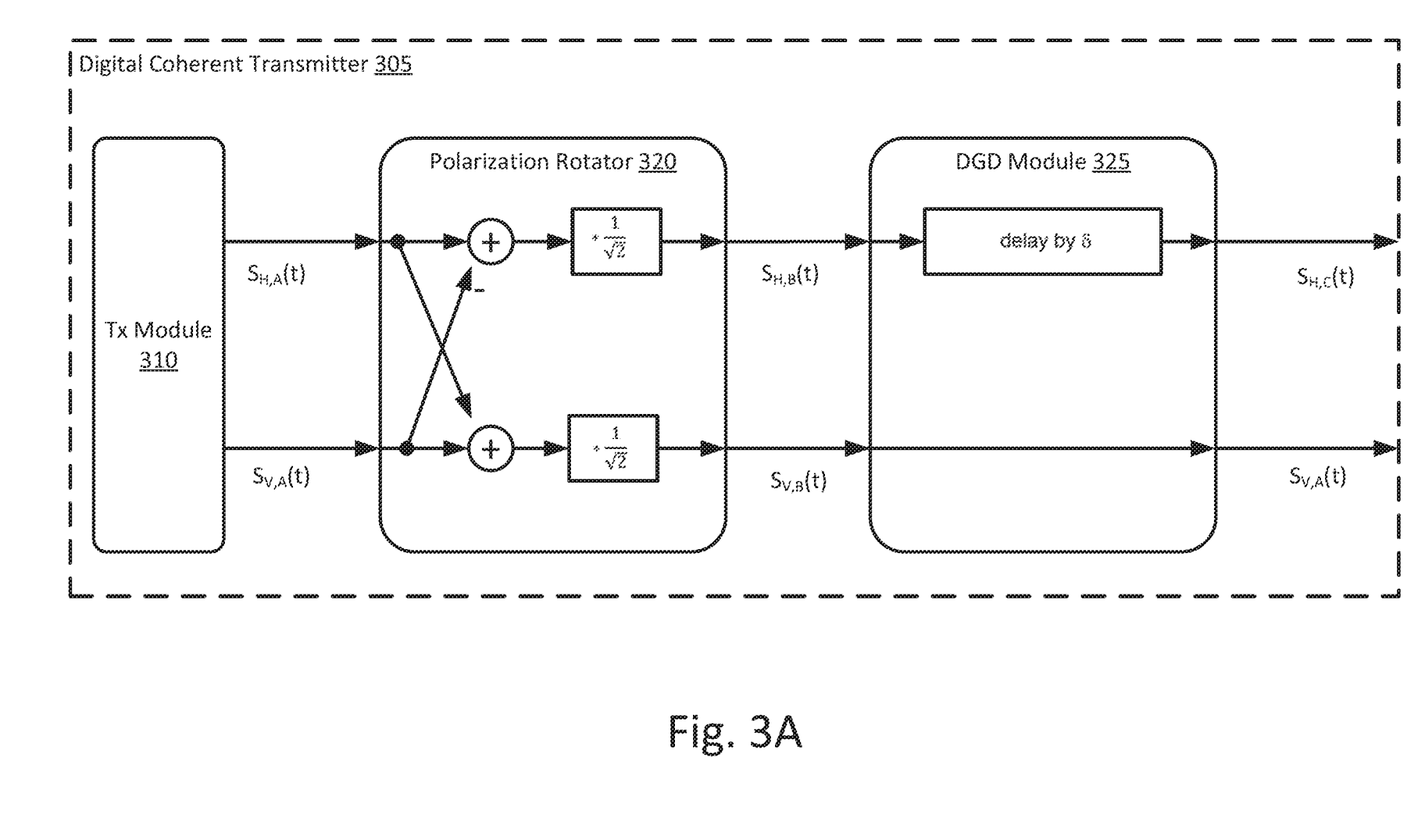
FIGS. 3A and 3B are high level block diagrams of an exemplary transmitter and receiver suitable for mitigating PDL, respectively, in accordance with one or more aspects of the disclosure.
Figure 3B:
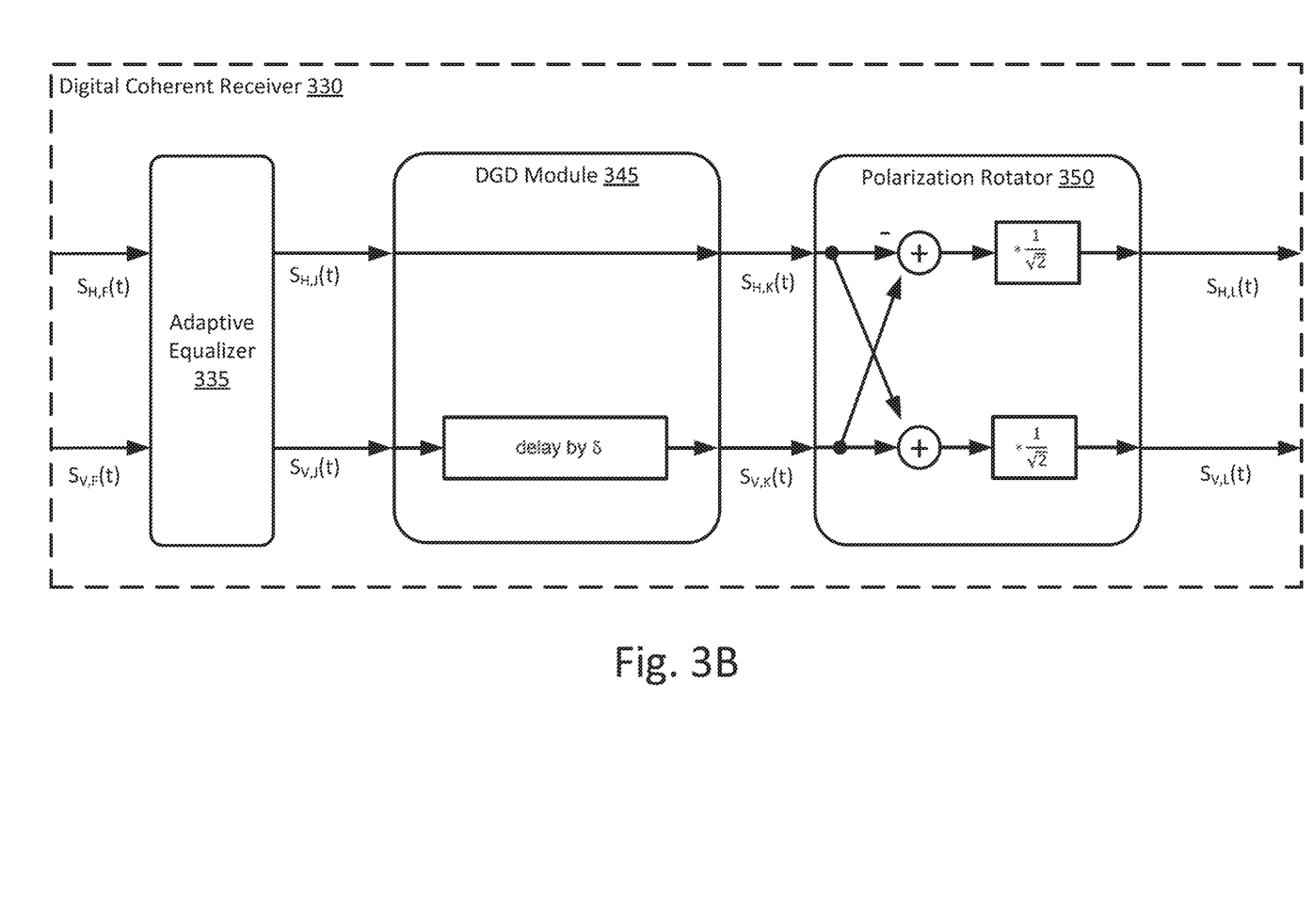

FIGS. 3A and 3B show a high level block diagram of the transmitter and receiver shown in FIG. 1, in accordance with one or more aspects of the disclosure. Shown in FIG. 3A is a digital coherent transmitter (transmitter) 305 which includes a transmit module 310 Polarization rotator 320 and DGD module 325. The transmitter 305 creates a complex optical signal represented by $S_{H,A}(t)$ and $S_{V,A}(t)$ where $S_{H,A}(t)$ is in the horizontal polarization and $S_{V,A}(t)$ is in the vertical polarization. In this embodiment, the polarization rotator module 220 rotates the optical signal received from the transmit module 310 (i.e., $S_{H,A}(t)$ and $S_{V,A}(t)$) by about 45 degrees. The DGD module 325 is operable to take the output of the polarization rotator module 220 and add a delay 'δ' to the horizontal component. As shown in FIGS. 3A and 3B, the delay 'δ' to the horizontal component is between 1 symbol and 256 symbols. In various embodiments, the delay 'δ' may be about 1 or more symbols. As shown in FIG. 3A, the transmitter 305 is operable to send each modified signal $S_{H,C}(t)$ and $S_{V,C}(t)$ across the optical network 130 (FIG. 1) to a digital coherent receiver (receiver) 230.

Shown in FIG. 3B is a digital coherent receiver (receiver) 330 which includes an adaptive equalizer 335 a DGD module 345 and a polarization rotator 350. The adaptive equalizer 335 is operable to filter incoming signals to correct for PDL and polarization changes imparted by optical fiber (such as for example optical fiber 115 of FIG. 1) onto the optical signal. The filter or other components on the receive side are operable to rotate polarization state of received combined signal to undo the initial rotation caused in the transmitter. As such, in this embodiment, the optical signal is received at the receiver 330 (i.e., $S_{H,F}(t)$ and $S_{V,F}(t)$). The DGD module 345 introduces a delay and the polarization rotator 350 reverses the polarization rotation of the incoming signal by about 45 degrees. Subsequently, the receiver 330 is enabled to further process the optical signals in other demodulator blocks (e.g., error checking, carrier recovery, etc.).

Figure 4A:
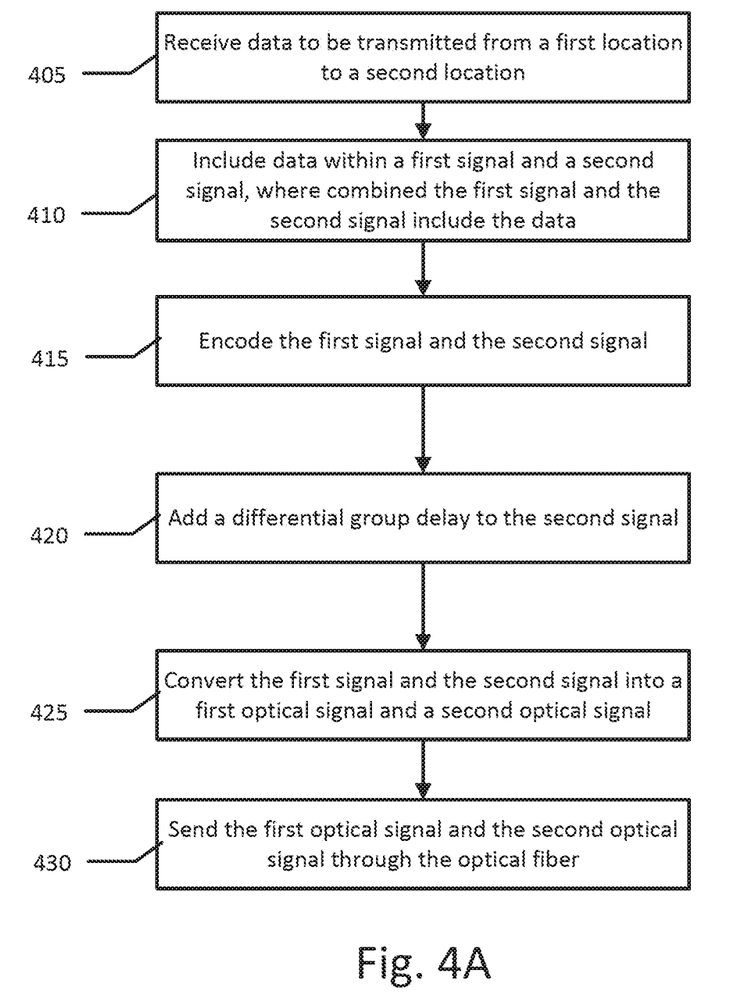
FIGS. 4A and 4B are flowcharts of methods of encoding and decoding an optical signal while mitigating PDL respectively, in accordance with one or more aspects of the disclosure.

Refer to the example embodiments of FIGS. 1 and 4A which illustrates a method of encoding an optical signal to maximize a signal to noise ratio for optical signal transmitted across an optical fiber, in accordance with one or more aspects of the disclosure. As previously described, the system 100 of FIG. 1 includes a transmitter 105 and a receiver 135 in optical communication via an optical network 130. The transmitter 105 receives data 160 to be transmitted from a first location to a second location (Step 405). The encoding module 115 embeds the data 160 within a first signal and a second signal, which are polarized components of an optical signal (Step 410). The encoding module 115 then encodes the first signal and the second signal by polarizing each signal by 45 degrees (Step 415). The encoding module 115 adds a differential group delay (DGD) to the second signal (Step 420). The digital to optical converter 120 converts the first signal and the second signal to a first optical signal and a second optical signal and sends the signal across the optical network 130 (Steps 425 and 430).

Figure 4B:
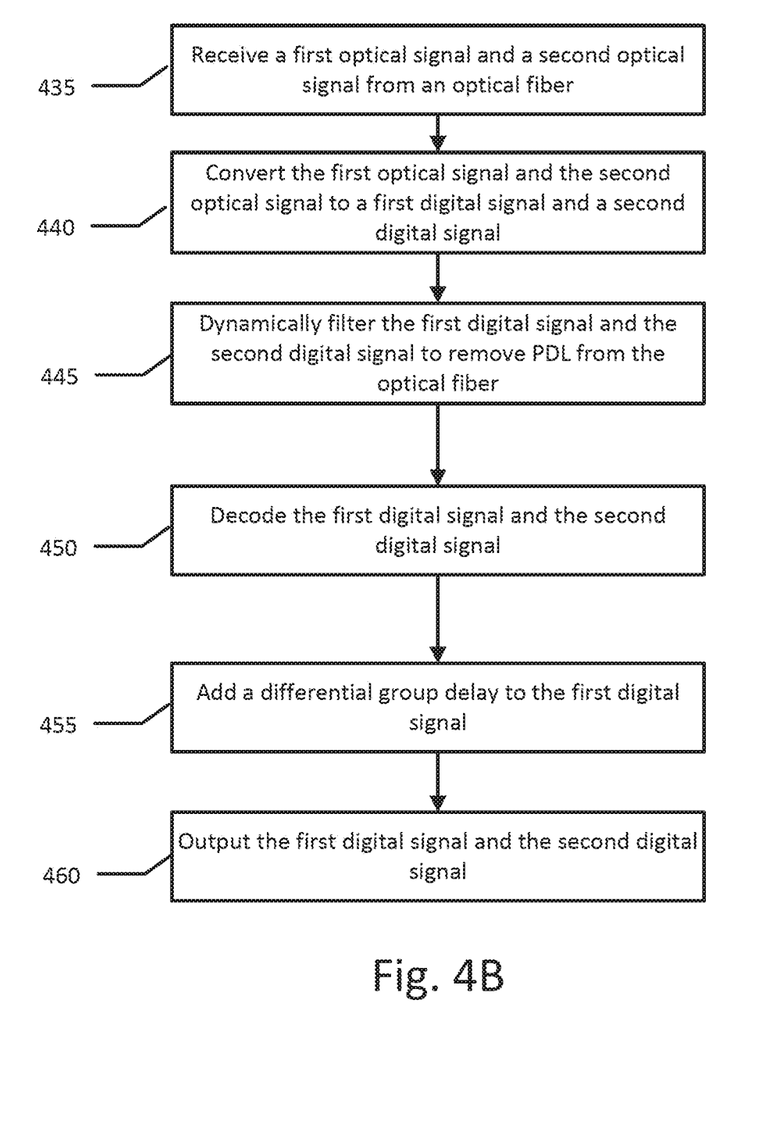

Refer to the example embodiments of FIGS. 1 and 4B, which illustrates a method of decoding an optical signal received across an optical fiber, in accordance with one or more aspects of the disclosure. The receiver 135 receives a first optical signal and a second optical signal from the optical network 130 (Step 435). The optical to digital converter 145 on the ASIC 140 converts the first optical signal and the second optical signal to a first digital signal and a second digital signal (Step 440). The adaptive equalizer 150 then filters the first digital signal and the second digital signal to remove PDL and any polarization rotation from the optical network 130 (Step 445). In various embodiments, an adaptive equalizer may use a dynamic filter with a feedback loop to remove the PDL and polarization rotation. As shown in FIG. 5B, the decoding module 155 decodes the first digital signal and the second digital signal and adds a differential group delay to the first digital signal (Steps 450 and 455). Subsequently, the receiver 135 outputs the first digital signal and the second digital signal (Step 460).

Figure 5A:
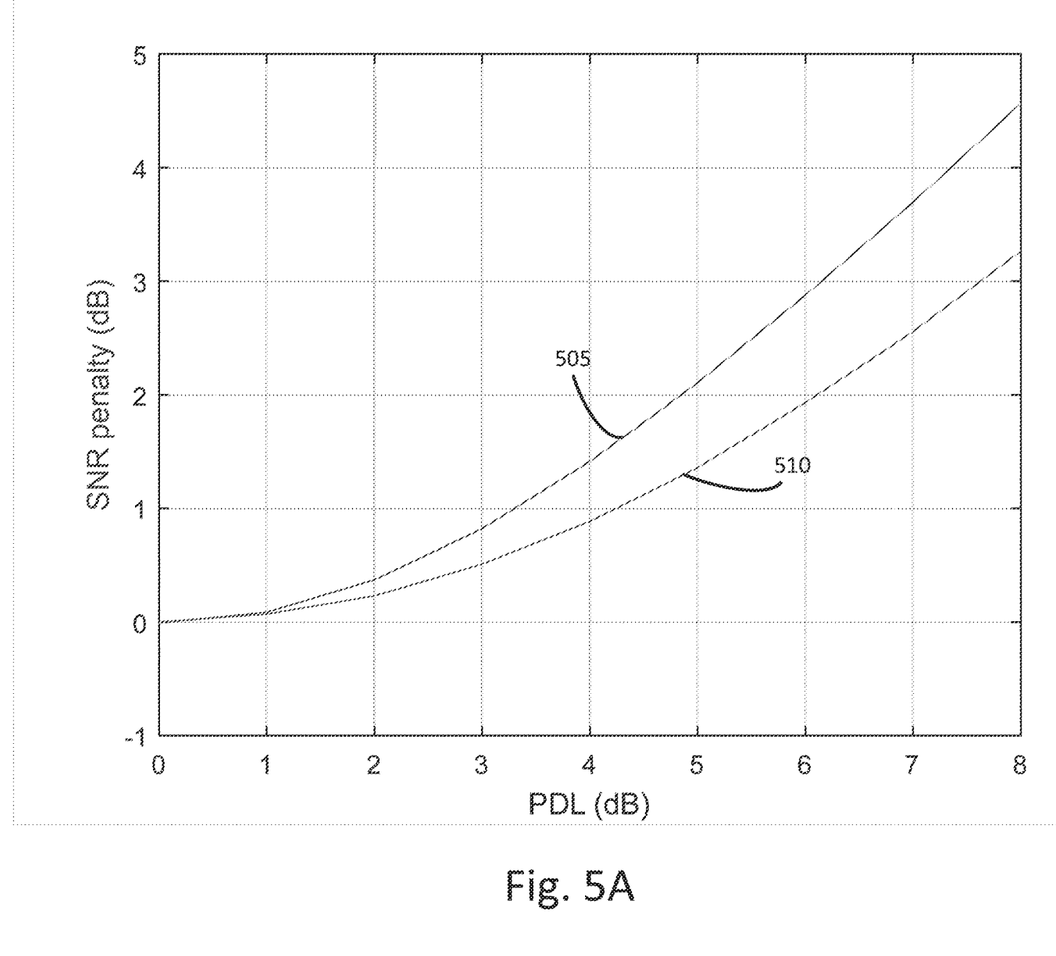
FIGS. 5A-5C show graphs comparing performance characteristics of transmitting optical signals across an optical network with and without PDL mitigation, in accordance with one or more aspects of the disclosure.
Figure 5B:
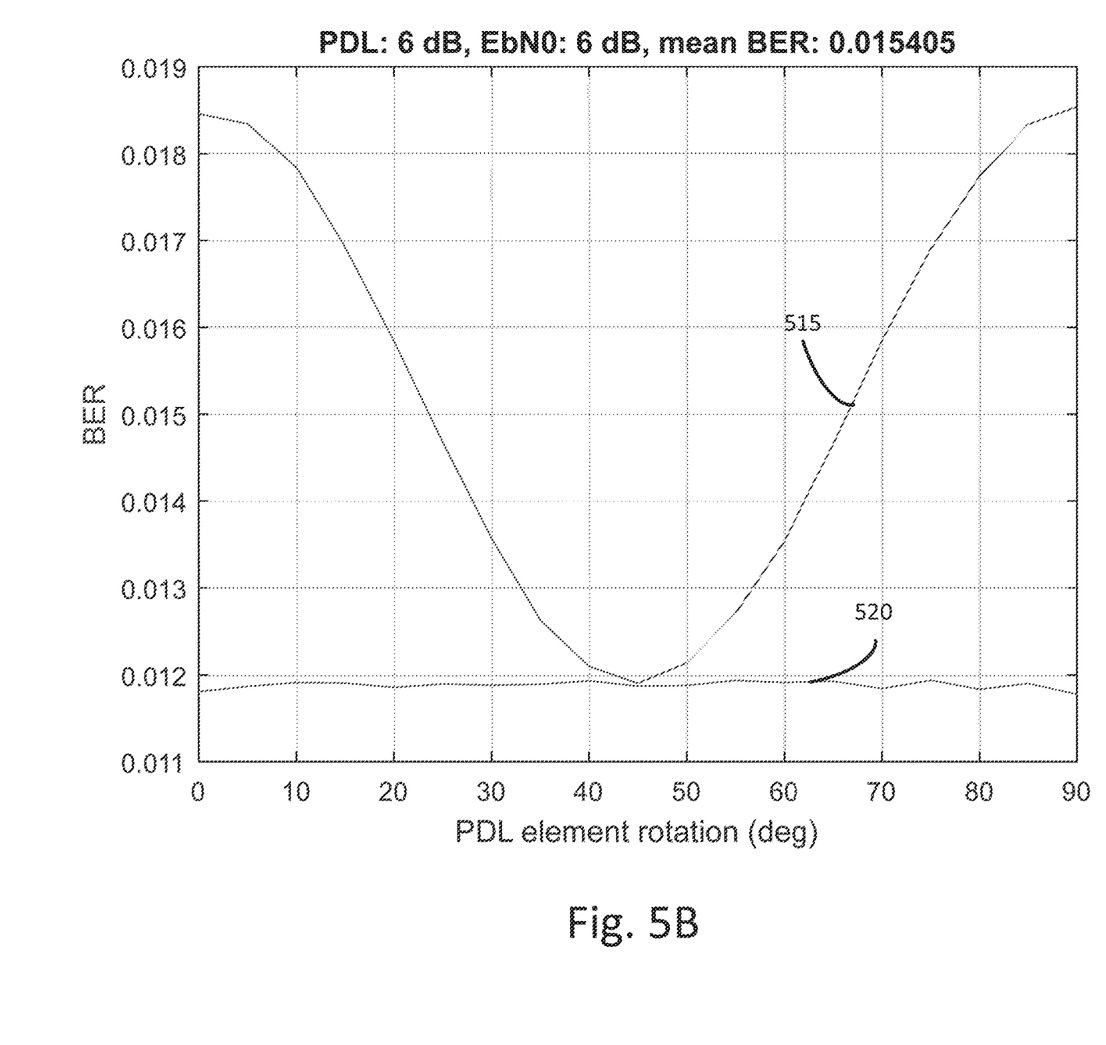
Figure 5C:
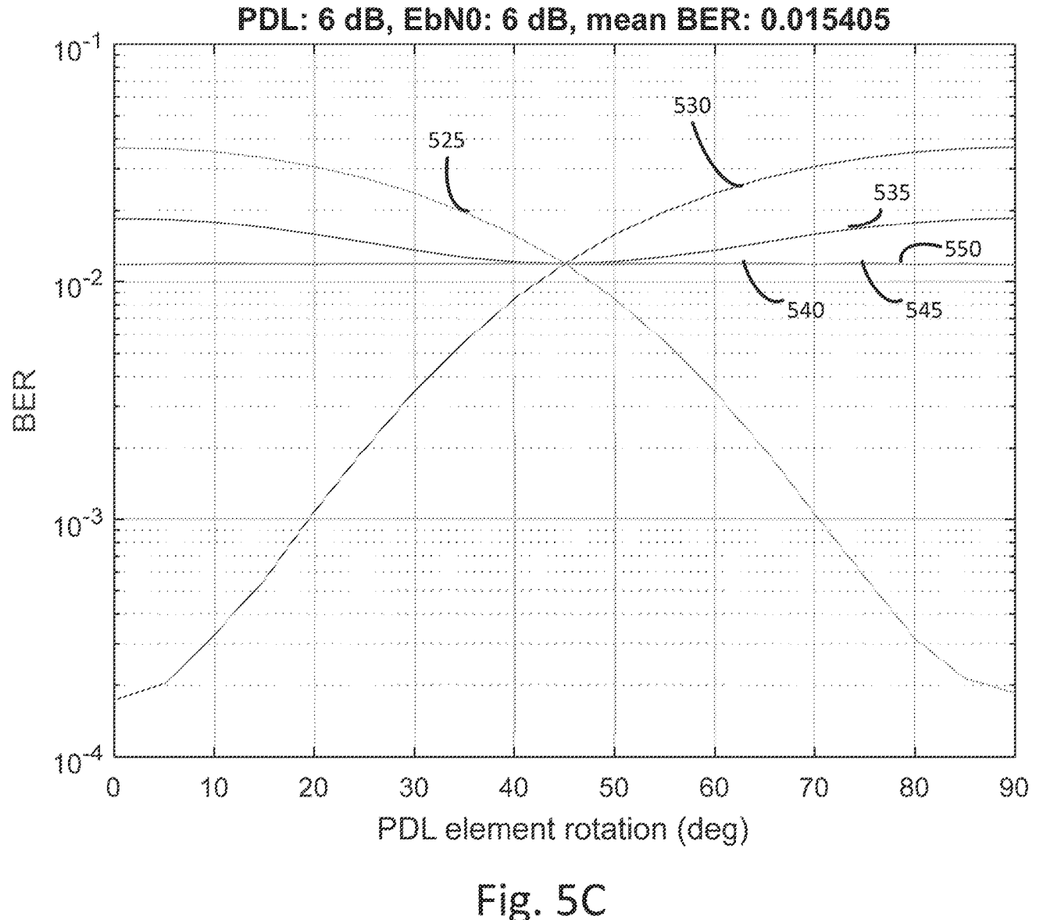

FIGS. 5A, 5B, and 5C show graphs illustrating the performance characteristics of transmitting optical signals across an optical fiber with and without PDL mitigation, in accordance with one or more aspects of the disclosure. FIG. 5A compares signal to noise ratio penalty versus magnitude of PDL effecting an optical signal transmitted across an optical fiber. In this instance, line 505 illustrates an optical signal transmitted without using PDL mitigation and line 510 illustrates an optical signal transmitted using PDL mitigation with the components of the optical signal rotated about 45 degrees. As shown, as PDL increases, an optical signal transmitted using PDL mitigation has a lesser penalty.

FIG. 5B compares the bit error rate with the amount of polarization rotation imported on a transmitted signal by an optical fiber. Line 515 shows the BER on an optical signal not using PDL mitigation and line 520 shows the BER on an optical signal using PDL mitigation. Line 515 shows that the BER fluctuates based on the amount of PDL element rotation. By contrast, line 520 shows an optical signal transmitted using PDL mitigation maintaining a nearly constant and/or minimal BER across any PDL element rotation encountered during transmission.

FIG. 5C shows a comparison of BER versus PDL element rotation with and without PDL mitigation. Without PDL mitigation, the BER of the vertically polarized component is shown by line 525, the BER of the horizontally polarized component is shown by line 530, and average BER is shown by line 535. By contrast, when using PDL mitigation, the BER is shown to be nearly constant, overlapping, and nearly indistinguishable across any PDL element rotation applied to an optical signal. For example, as shown in FIG. 5C, BER of the horizontally polarized component with mitigation is shown by line 540, BER of the vertically polarized component with mitigation is shown by line 545, and average BER using mitigation is shown by line 550. It is noteworthy that all of the plots of various curves shown in FIG. 5C are meeting in the same point at about 45 degrees corresponding to an exemplary rotational angle that results in the same performance with and without PDL mitigation. Performance with PDL mitigation will be the same at all other rotation angles, while without PDL mitigation it will degrade at these other angles.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

What is claimed is:

1. A method of mitigating polarization dependent loss, the method comprising:
generating a first signal having a first polarization and a second signal having a second polarization;
rotating a polarization of the first signal and the second signal by θ degrees;
adding a first delay to the second signal;
generating a first optical signal from the first signal;
generating a second optical signal from the second signal;
receiving the first optical signal and the second optical signal; and
adding the first delay to the first optical signal.

2. The method of claim 1, wherein the first delay is between about 1 symbol and 40 symbols.

3. The method of claim 1, further comprising:
sending the first optical signal and the second optical signal across a fiber link; and
wherein the first delay is greater than a delay of the fiber link.

4. The method of claim 1, wherein the first optical signal is vertically polarized and the second optical signal is horizontally polarized.

5. The method of claim 1, wherein the first delay is greater than about 1 symbol.

6. The method of claim 1 further comprising reversing a polarization of the first optical signal and the second optical signal by θ degrees.

7. The method of claim 6, wherein θ is about 45 degrees.

8. A non-transitory machine readable medium storing code, which when executed by a processor is configured to:
create a first signal and a second signal;
rotate a polarization of the first signal and the second signal by θ degrees, wherein θ is about 45 degrees;
add a first delay to the second signal;
generate a first optical signal from the first signal;
generate a second optical signal from the second signal.

9. The non-transitory machine readable medium storing code of claim 8, wherein the first delay is between about 1 symbol and 40 symbols.

10. The non-transitory machine readable medium storing code of claim 8, wherein a polarization of the first signal and a polarization of the second signal are orthogonal.

11. The non-transitory machine readable medium storing code of claim 8, wherein, when executed by a processor, is further configured to:
generate a first optical signal from the first signal; and
generate a second optical signal from the second signal.

12. The non-transitory machine readable medium storing code of claim 11, wherein, when executed by a processor, is further configured to:
send the first optical signal and the second optical signal across a fiber link; and
wherein the first delay is greater than a delay of the fiber link.

13. The non-transitory machine readable medium storing code of claim 11, wherein the first optical signal is vertically polarized and the second optical signal is horizontally polarized.

14. The non-transitory machine readable medium storing code of claim 8, wherein, when executed by a processor, is further configured to:
reverse a polarization of the first optical signal and the second optical signal by θ degrees.

15. The non-transitory machine readable medium storing code of claim 14, wherein θ is about 45 degrees.

16. The system of claim 14, wherein θ is about 45 degrees.

17. A system comprising:
an optical transmitter configured to perform:
creating a first signal and a second signal, wherein the first signal and the second signal are each polarized;
rotating a polarization of the first signal and the second signal by θ degrees;
adding a first delay to the second signal; and
adding the first delay to the first signal such that polarization dependent loss is reduced.

18. The system of claim 17, wherein the first delay is between about 1 symbol and about 40 symbols.

19. The system of claim 17, wherein the first delay is greater than about 1 symbol.

20. The system of claim 17, wherein a polarization of the first signal and a polarization of the second signal are orthogonal.

21. The system of claim 17, wherein one or more processors are further configured to perform:
generating a first optical signal from the first signal; and
generating a second optical signal from the second signal.

22. The system of claim 21, wherein the one or more processors are further configured to perform:
sending the first optical signal and the second optical signal across a fiber link; and
wherein the first delay is greater than a delay of the fiber link.

23. The system of claim 21, wherein the first optical signal is vertically polarized and the second optical signal is horizontally polarized.

24. The system of claim 17, wherein one or more processors are further configured to perform: reversing a polarization of the first signal and the second signal by θ degrees.

25. A system comprising:
an optical transmitter including a memory and one or more processors, wherein the one or more processors are in communication with the memory and configured to:
create a first signal and a second signal;
add a first delay to the second signal; and
generate a second optical signal from the second signal, wherein one or more processors are further configured to perform reversing a polarization of the first signal and the second signal by θ degrees.

* * * * *